United States Patent [19]

Fosse

[11] Patent Number: 4,467,360

[45] Date of Patent: Aug. 21, 1984

[54] MULTI-STANDARD TELEVISION RECEIVER FOR RECEIVING A TELEVISION SIGNAL WHOSE SOUND CARRIER IS FREQUENCY-MODULATED (FM) OR AMPLITUDE-MODULATED (AM)

[75] Inventor: Robert Fosse, Rueil-Malmaison, France

[73] Assignee: U.S. Philips Corporation, New York, N.Y.

[21] Appl. No.: 391,192

[22] Filed: Jun. 23, 1982

[30] Foreign Application Priority Data

Jul. 1, 1981 [FR] France ................................ 81 12938

[51] Int. Cl.³ ........................... H04N 5/62; H04B 1/16
[52] U.S. Cl. .................................... 358/197; 358/198;
455/142; 455/144
[58] Field of Search ............... 358/197, 198, 140, 181;
455/144, 142

[56] References Cited

U.S. PATENT DOCUMENTS 2,686,221 10/1954 Avins .................................. 358/189

OTHER PUBLICATIONS

H. L. Weinberger; FM-to-AM Converter for Satellite Direct Broadcast; IEEE Transactions on Consumer Electronics, vol. CE-21, No. 4; Nov. 1975; p. 404.

*Primary Examiner*—Howard W. Britton
*Assistant Examiner*—John K. Peng
*Attorney, Agent, or Firm*—Thomas A. Briody; William J. Streeter; Edward W. Goodman

[57] ABSTRACT

On receipt of an FM sound signal an intermediate frequency signal (at 1) is directly applied to an AM demodulator (80) via an electronic switch (50). The audio signal is then obtained by frequency demodulation (in 10) of an intercarrier signal obtained from the demodulator (80). On receipt of an AM sound signal the intermediate frequency signal is applied to the AM demodulator (80) via a filter (6) and the audio signal is obtained from the output of the AM demodulator (80).

6 Claims, 4 Drawing Figures

MULTI-STANDARD TELEVISION RECEIVER FOR RECEIVING A TELEVISION SIGNAL WHOSE SOUND CARRIER IS FREQUENCY-MODULATED (FM) OR AMPLITUDE-MODULATED (AM)

BACKGROUND OF THE INVENTION

The invention relates to a multi-standard television receiver for receiving a television signal whose sound carrier is frequency-modulated (FM) or amplitude-modulated (AM), the receiver comprising an intercarrier sound channel incorporating a frequency demodulation circuit and an intermediate frequency portion having an output, a sound intermediate frequency channel of which is coupled to a filter circuit and to an amplitude demodulation circuit.

Funketechnik, 1977, No. 15, pages F & E 245-251 discloses a television receiver of the above-described type in which the intercarrier channel is connected to an output of a video detector which is connected to an output of the intermediate frequency portion.

Said circuit has the disadvantage that a suppression filter incorporated in the intermediate frequency portion produces a considerable attenuation of the sound carrier of the order of approximately 26 dB and whereby the picture carrier is attenuated by approximately 6 dB. Consequently, on receipt of a weak signal the signal-to-noise ratio becomes poor and an annoying interference occurs in the sound, even if the picture quality is still acceptable.

To obviate this disadvantage it is possible to add a separate intercarrier detector which however, would imply the use of an additional integrated circuit.

SUMMARY OF THE INVENTION

The invention has inter alia for its object to provide a multi-standard television receiver which ensures an excellent quality of the received FM sound in all conditions of use without noticeably increasing the manufacturing costs.

According to the invention, a multi-standard television receiver of the type described in the opening paragraph, is characterized in that an input of the intercarrier sound channel is coupled to an output of the amplitude demodulation circuit of the sound intermediate frequency channel and the filter circuit of the sound intermediate frequency channel can be switched over from processing the FM to processing the AM sound carrier.

Owing to the measure in accordance with the invention, it is not necessary to add an additional intercarrier detector, while it is still possible to dimension the sound channel and the picture channel optimally.

Preferably, the switch-over of the filter circuit for the AM and FM sound receiving functions is effected by means of semiconductor diodes.

In the receiving mode for FM sound, AM demodulation of the picture carrier makes it possible to obtain the intercarrier (FM) sound carrier without attenuation, which intercarrier supplies the audio signal after having passed through an intercarrier filter and the FM demodulator.

DESCRIPTION OF THE DRAWINGS

The invention will now be further described by way of example with reference to the accompanying drawings.

In the drawings.

DESCRIPTION OF THE PREFERRED EMBODIMENTS

Figure 1:
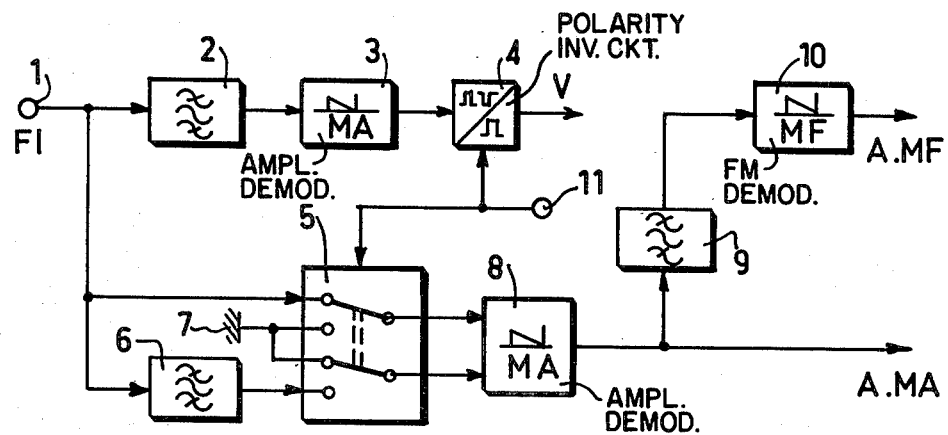
FIG. 1 illustrates by means of a block schematic circuit diagram a construction of a video and audio-frequency portion of a multi-standard television receiver in accordance with the invention.

In FIG. 1 an intermediate frequency signal input 1 is connected to an input of a first video-frequency bandpass filter 2, whose output is connected to the input of a first AM amplitude-demodulator 3, to an output of which a polarity-inverting circuit 4 is connected, an output of which supplies a video-frequency signal (V).

The input 1 is further connected to a first terminal of a dual electronic change-over switch 5, and also to the input of a second filter 6, the output of which is connected to a second terminal of the change-over switch 5. The two other terminals of the change-over switch 5 are connected to ground 7. The two master contacts of the change-over switch 5 are connected to respective inputs of a second amplitude-demodulator 8, a demodulated output of which supplies the audio signal on receipt of a AM sound signal.

The output of the demodulator 8 is also connected to an input of a third filter 9, the output of which is connected to the input of an FM frequency demodulator 10, the output of which supplies the demodulated audio signal on receipt of an FM sound signal.

A systems change-over signal input 11 is connected to a change-over signal input of the polarity inverting circuit 4 and also to a change-over signal input of the dual electronic change-over switch 5.

The circuit of FIG. 1 operates as follows:

At an input 1 the intermediate frequency signal has the picture and sound carrier intermediate frequencies. With the standards B, G, I, K, K', M and N, the sound carrier is frequency-modulated and the picture carrier is negatively amplitude-modulated.

In contrast therewith, with the standards L, L' and C, the sound carrier is amplitude-modulated and the picture carrier is positively amplitude-modulated.

In the first case a change-over signal applied to the input 11 adjusts the dual change-over switch 5 to the position shown. Then, after having passed through the filter 2, the picture carrier is demodulated and the video signal obtained is given such a polarity by means of the change-over switch 4 that it renders a normal drive of a picture display tube (not shown) possible.

In the position shown of the change-over switch 5 the filter 6 is inoperative. The picture and sound carriers are then directly applied to differential inputs of the demodulator 8. An intercarrier signal having the differential frequency of the two carriers is transmitted by the filter 9 and applied to the frequency demodulator 10, which then supplies an audio signal AMF.

If, for example, the intermediate frequency of the picture signal is 32.7 MHz and the intermediate frequency of the sound signal is 38.7 MHz, the filter 9 must be tuned to 38.7−32.7=6 MHz.

It is obvious that the demodulator 8 must have an adequate passband for processing the picture and sound carriers without attenuation. This requirement is satisfied when an integrated circuit TDA 1038 marketed by R.T.C. LA RADIOTECHNIQUE-COMPELEC is used as the demodulator 8.

As the frequency difference between the picture and sound carriers in the standards B. G, I, K, K', M or N must be different, the tuning of the filter 9 and the FM demodulator 10 must be adapted in a manner, not shown, when a change-over is effected between the reception of two transmitters having different standards, the differential frequencies of the carriers of which are, for example, 6 and 5.5 MHz, respectively.

For the reception of the standards L, L' or C a different switching signal is applied to the input 11, in response to which the polarity inverting device 4 is made operative and the dual change-over switch 5 is adjusted to the position not shown.

The modulation of the picture carrier which was first negative now becomes positive, but owing to the change of state of the polarity inverting circuit 4, the video signal V remains of the same polarity.

The sound carrier is selected by the filter 6 and applied to the inputs of the demodulator 8. The amplitude-modulated sound carrier is then demodulated by the AM demodulator 8 and the audio signal AMA appears at an output of this AM demodulator 8.

Figure 2:
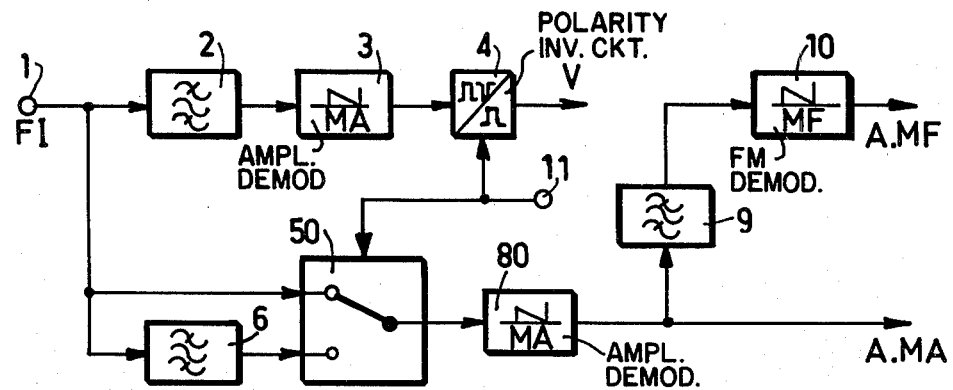
FIG. 2 illustrates by means of a block schematic circuit diagram a further possible embodiment of a video and audio-frequency portion of a television receiver in accordance with the invention.

In FIG. 2 in which corresponding components are given the same reference numerals as in FIG. 1, the dual change-over switch 5 of FIG. 1 is replaced by a single change-over switch 50, and the demodulator 8 which in FIG. 1 has a differential input is replaced by a demodulator 80 having a single input.

In all further respects the operation of the circuit shown in FIG. 2 is the same as that of FIG. 1.

It should be noted that the demodulator 80 with the single input may, for example, be formed by the demodulator 8 of FIG. 1, of which one of the inputs is permanently connected to ground.

Figure 3:
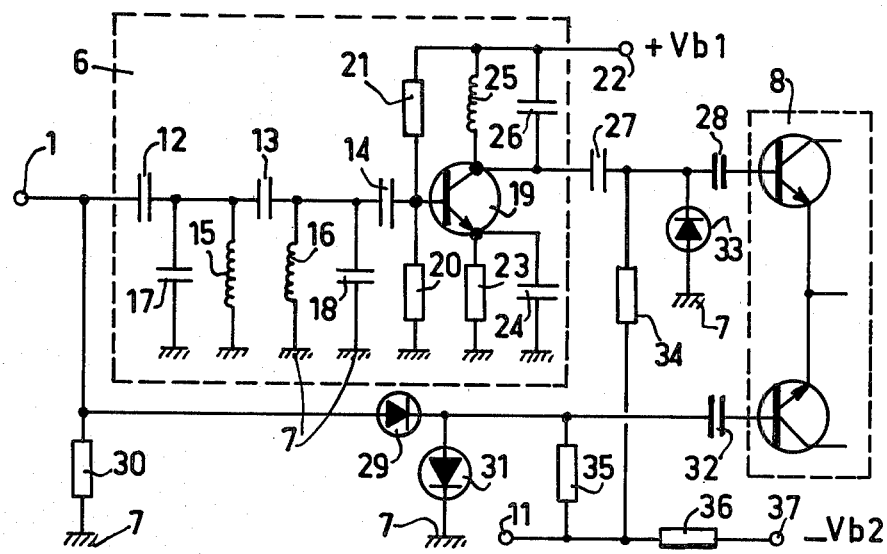
FIG. 3 shows by means of a circuit diagram a possible embodiment of the video and audio-frequency portion of FIG. 1.

In FIG. 3 in which components corresponding with those in the FIGS. 1 and 2 are given the same reference numerals, the filter 6, which is of the active type, incorporates a series arrangement of three capacitors 12, 13 and 14 and two tuned parallel circuits formed from two inductances 15, 16 and two capacitors 17, 18. One of the plates of the capacitor 14 is connected to the base of a transistor 19 of the NPN-type, this base further being connected to a voltage divider, formed by two resistors 20, 21, which is connected between a negative terminal, which is connected to ground 7, and a positive terminal 22 of a first voltage source Vb1.

Via a resistor 23, which is decoupled by a capacitor 24, the emitter of the transistor 19 is connected to ground, while the collector is connected to the terminal 22 via a parallel arrangement of an inductance 25 and a capacitor 26.

Via two series-arranged capacitors 27 and 28, the collector of the transistor 19 is coupled to one of the inputs of the demodulator 8.

The anode of a first switching diode 29 is connected to the input 1 and is further connected to ground 7 via a resistor 30.

The cathode of the diode 29 is connected to the anode of a second switching diode 31 and is further coupled to the other input of the demodulator 8 via a capacitor 32.

The junction between the capacitors 27 and 28 is connected to the cathode of a third switching diode 33, the anode of which is connected to ground 7, and is further connected to the change-over signal input 11 via a resistor 34.

Via a resistor 35, the change-over signal input 11 is also connected to the interconnected cathode and anode of the diodes 29 and 31 and via resistor 36 to a negative terminal 37 of a voltage source Vb2, the positive terminal of which is connected to ground 7.

The structure and the operation of the active filter 6 are known, and any other type of filter having comparable results may be used if so desired.

The circuit operates as follows: On receipt of the frequency-modulated sound (standards B, G, I, K, K', M N), no voltage is applied to the input 11, the diode 33 is then rendered conductive via the resistors 34 and 36 and the first input of the demodulator 8 is connected to ground via the capacitor 28; in addition, the diode 29 becomes conductive via the resistors 30, 35 and 36, while diode 31 is blocked. The picture and sound carriers coming from the input 1 are applied to the other input of the demodulator 8 via the diode 29 and the capacitor 32, the first input being connected to ground since the diode 33 is conductive, in these circumstances the filter 6 is consequently inoperative.

On receipt of the amplitude-modulated sound (standards L, L', C), a positive voltage, which is at least equal to the value of the negative voltage −Vb2 is applied to the change-over signal input 11; in response thereto the diodes 33 and 29 are cutoff and the diode 31 conducts, the diode 31 connecting the other input of the demodulator 8 to ground via the capacitor 32. The picture and sound carriers coming from the input 1 are then passed through the filter 6, only the sound carrier being left at the collector of the transistor 19, which sound carrier is applied to the first input of the demodulator 8 via the capacitors 27 and 28.

It will be obvious that the switching functions of the dual change-over switch 5 of FIG. 1 are effected by alternately connecting one of the inputs of the demodulator to ground and making the other input operative.

Figure 4:
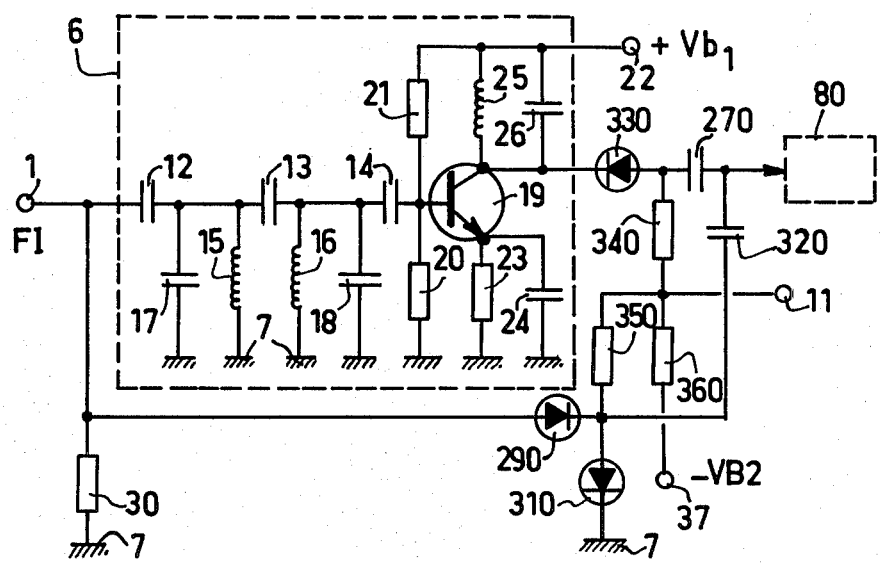
FIG. 4 illustrates by means of a circuit diagram a possible embodiment of the video and audio-frequency portion of FIG. 2.

In FIG. 4, in which components which correspond to those shown in the FIGS. 1, 2 and 3 are given the same reference numerals, the collector of the transistor 19 is connected to the cathode of a diode 330 the anode of which is coupled to the single input of the demodulator 80 via a capacitor 270, while this single input is further coupled via a capacitor 320 to the junction between a cathode and an anode of diodes 290 and 310, respectively.

The circuit operates as follows: for the reception of the frequency-modulated sound (standards B, G, I, K, K', M, N), no voltage is applied to the change-over signal input 11; the diodes 310 and 330 are then nonconducting and the diode 290 is conducting via the resistor 30, 350 and 360. As a result thereof, the picture and sound carriers coming from the input 1 are applied to the input of the demodulator 80 via the diode 290 and the capacitor 320, while the diode 330 blocks the signals present on the collector of the transistor 19.

For the reception of amplitude-modulated sound (standards L, L', C), a positive voltage, which is at least equal to the value of the negative voltage −Vb2 and somewhat higher than the voltage +Vb1, is applied to the changeover signal input 11. The diode 330 then conducts via the resistor 340, the diode 310 conducts via the resistor 350 and the diode 290 is cutoff. The picture and sound carriers are then applied to the filter 6 and at the collector of the transistor 19 only the sound carrier appears, which is applied to the input of the demodulator 80 via the diode 330 and the capacitor 270. The diode 290 blocks the signal coming from the input 1.

The diode 310 has for its function to connect the diode 290 and the capacitor 320 to ground to prevent any parasitic coupling via the capacitance of the diode 290. The capacitor 320 must therefore have a sufficiently low value so as to ensure that the signal applied to the input of the demodulator 80 is not attenuated too much. If so desired, the diode 310 may be omitted if the capacitance of the diode 290 is very small.

It will be obvious that the switching function of the single change-over switch 50 of FIG. 2 is effected, that is to say the direct conveyance of the signals coming from the input 1 to the demodulator 80 or passing these signals through filter 6.

It is of course alternatively possible to use a synchronous or substantially synchronous demodulator as the amplitude demodulator 8, if also the filters in the reference channel of such a demodulator are simultaneously changed-over.

So, it is, for example, possible to use an integrated circuit TDA 2545, on reception of a FM sound signal the filter circuit being formed by an input filter having a response peak at the picture intermediate frequency and at the sound intermediate frequency and a reference signal filter tuned to the picture intermediate frequency. On receipt of an AM sound signal the filter circuit has to be changed-over so that the input filter only transmits the sound intermediate frequency and the reference signal filter is slightly detuned from the sound intermediate frequency. This detuning is necessary as otherwise, owing to the construction of the integrated circuit a difference of 90° would occur between the reference signal and the signal to be detected.

What is claimed is:

1. A multi-standard television receiver for receiving a television signal the sound carrier of which is either frequency modulated (FM) or amplitude-modulated (AM), having means for providing an intermediate frequency-signal including a picture and a sound carrier intermediate frequency, a video-frequency demodulation circuit, and a sound-frequency demodulation circuit, characterized in that said sound-frequency demodulation circuit comprises a filter circuit for receiving said intermediate frequency signal, a sound-amplitude demodulation circuit having input means and an output, switching means for selectively applying said intermediate frequency signal and an output of said filter to said sound-amplitude demodulation circuit input means, a further filter coupled to the output of said sound-amplitude demodulation circuit, and an FM demodulation circuit coupled to an output of said further filter, whereby on receipt of an AM sound carrier, said AM demodulation circuit provides a respective sound signal, while on receipt of an FM sound carrier, said FM demodulation circuit provides the sound signal.

2. A multi-standard television receiver as claimed in claim 1, characterized in that the amplitude demodulation circuit is of a type having a differential signal input and said switching means is a dual electronic change-over switch for selectively connecting said differential signal input to said intermediate frequency signal and to said filter.

3. A multi-standard television receiver as claimed in claim 2, characterized in that the dual electronic change-over switch comprises three semi-conductor diodes one of which is arranged between an input for the intermediate frequency signal and one of the differential signal inputs of the amplitude demodulation circuit and the two other diodes are connected between each input terminal of the amplitude demodulation circuit and ground.

4. A multi-standard television receiver as claimed in claim 1, characterized in that the amplitude demodulation circuit is of a type having a single input and said switching means is a single electronic change-over switch for selectively connecting said single input to said intermediate frequency signal and the output of said filter.

5. A multi-standard television receiver as claimed in claim 4, characterized in that the single electronic switch comprises two semiconductor diodes one of which is provided between an input for the intermediate frequency signal and the input of the amplitude demodulation circuit and the second diode is connected between the output of the said filter and the input of the amplitude demodulation circuit.

6. A multi-standard television receiver as claimed in claim 3 or 5, characterized in that the diodes are connected to a supply voltage terminal via a resistance network, and a common point of the resistance network is connected to a switching signal input, to which is selectively applied a zero voltage or a voltage which is at least equal to, but of the opposite sign than, the voltage on the above-mentioned voltage supply terminal for effecting the switching of said switching means.

* * * * *